UNITED STATES PATENT OFFICE.

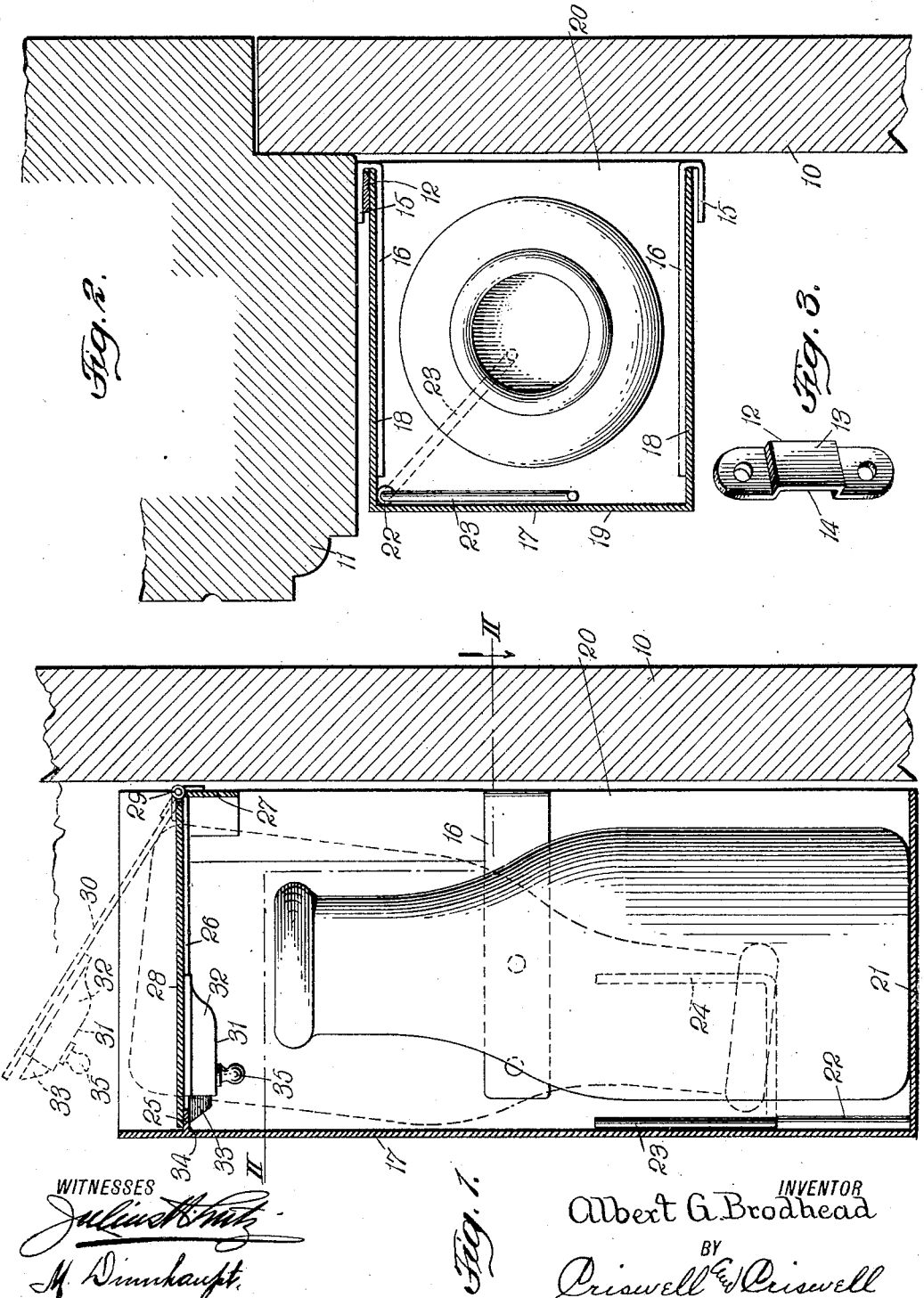

ALBERT G. BRODHEAD, OF NEW YORK, N. Y., ASSIGNOR OF ONE-HALF TO DENNIS J. DELANEY, OF NEW YORK, N. Y.

MILK-BOTTLE RECEPTACLE.

941,853.  Specification of Letters Patent.  Patented Nov. 30, 1909.

Application filed May 12, 1909. Serial No. 495,453.

*To all whom it may concern:*

Be it known that I, ALBERT G. BRODHEAD, a citizen of the United States, and a resident of New York, county and State of New York, have invented certain new and useful Improvements in Milk-Bottle Receptacles, of which the following is a full, clear, and exact description.

This invention relates more particularly to a receptacle adapted to be placed outside of a house to hold a milk bottle or other object.

The primary object of the invention is to provide a receptacle in which is adapted to be placed an empty milk bottle which is so held and positioned within the receptacle that it may be readily removed by the milkman and another bottle containing milk placed within the receptacle, and the latter bottle automatically locked within the receptacle so that the same cannot be removed except by the party for whom the milk is intended.

Another object of the invention is to provide a receptacle which may be attached convenient to the door so that the door will close one side of the same in such a way that the milk bottle or other object within the receptacle cannot be removed until the door is opened.

A further object of the invention is to provide a receptacle which is adapted to hold various kinds of articles, and which has a locking door or member adapted to be held in an open position by an empty bottle placed therein, and which automatically locks when the empty bottle is removed and a full bottle placed within the receptacle.

With these and other objects in view, the invention will be hereinafter more particularly described with reference to the accompanying drawings, which form a part of this specification, and will then be pointed out in the claims at the end of the description.

In the drawings, Figure 1 is a vertical section of one form of device or receptacle embodying my invention. Fig. 2 is a sectional plan view taken on the line II—II of Fig. 1; and Fig. 3 is a detail perspective view of the fastening cleats or devices.

The door 10 is adapted to be hinged or otherwise held, and is adapted to engage the door jamb 11 in the usual way, and fastened to the jamb adjacent to where the door engages the same, is a cleat or device 12. This cleat may be in the form of a plate having its body portion bent or formed, as at 13, to provide a space 14 into which is adapted to fit the hooked end 15 of a fastening device 16. There are two devices 16 which are fastened to or formed integral with a casing 17, and the purpose of providing two devices 16 is to adapt the receptacle to be positioned on either side of the door frame according to which way the door opens. As will be seen the hooked end 15 passes from the rear outwardly through the opening 14, close enough to the door 10 to prevent the receptacle from being moved until the door is opened. The devices 16, as shown, are each in the form of a plate, the outer part of which is substantially U-shaped, and is passed through a slot or opening cut into the rear edges of the side walls 18 of the receptacle or casing 17.

The casing 17 may be substantially rectangular and is provided with a front wall 19 to close that portion of the receptacle, and is open, as at 20, in the rear to permit the removal of any object within the same when the door 10 is opened, or to prevent access to the receptacle when the door is closed, the object to be delivered normally resting upon the bottom 21 of the receptacle. By this means the receptacle may be closed on all sides except the rear thereof, and may be quickly and rigidly held in position against the door jamb to prevent access to the bottle or other object except by the party for whom the object is intended.

A socket piece 22 in the form of a tube is located in one corner of the receptacle, and pivotally held in this socket piece is a device 23. This device is intended to support the bottle in an inverted position, as shown in dotted lines in Fig. 1, and is provided with a stem portion which fits into the socket piece 22, and with an angular or L-shaped part 24, the end of which is adapted to fit within the bottle so as to hold the same properly supported thereon.

The receptacle is provided with a top plate or portion 25 having an opening 26 therethrough of sufficient size to permit the object to be placed within the receptacle and to form a ledge around the top of the casing, the said top being located somewhat below the upper edge of the casing or receptacle 17. The upper part may be provided with a transversely extending bar 27, and to this bar is held a top door member 28 which is hinged, as at 29, to the bar 27 so as to swing or move upward, as shown in dotted lines, at 30, Fig. 1. The device 24 is so positioned with respect to the door or member 28 that the bottle when inverted will project through the opening 26 a distance sufficient to hold the member 30 open, and under said door is a latch or lock 31 which comprises a casing 32 and a spring bolt 33, so arranged that on the downward movement of the door, the beveled outer edge of the bolt will engage the ledge of the top plate so as to cause the bolt to be forced inward in order that the same may automatically engage under the ledge, as 34, to lock and hold the door against being released except from within the receptacle, which may be done by means of the handle 35, as is usual in locks or latches of this character.

It will be seen that when a receptacle is in the position shown and the empty bottle inverted as shown in dotted lines in Fig. 1, the door 28 will be held in an open position, and when the bottle is removed, the device 23 may be moved to the position shown in full lines, Figs. 1 and 2, so that a fresh milk bottle may be placed in the position shown in full lines in Fig. 1, in which case the hinged member 30 will automatically close the opening 26 and hold the bottle against removal except when the door 10 is opened.

From the foregoing it will be seen that a simple and efficient receptacle or container for milk bottles or other objects is provided which serves to prevent the bottle of milk or other object from being carried away by any other person than the one for whom the bottle or object is delivered; that a simple and efficient receptacle is provided which may be quickly attached to or detached from its support when not in use; that simple means is provided for supporting the empty bottle and for permitting the receptacle to be locked to prevent the removal of a filled bottle or other object; and that said device or receptacle is so constructed that it may be placed on either side of the door frame or jamb, or readily attached to another support, and that said device or receptacle is adapted to be used for various purposes.

Having thus described my invention, I claim as new and desire to secure by Letters Patent:—

1. In a receptacle of the character described, the combination with a door and jamb, of a holding device attached to the jamb, a casing adapted to be held by said holding device having an open side adapted to be closed by the door, said casing having an open top, a hinged member adapted to close the top of the receptacle, and means arranged within the casing and adapted to maintain a milk bottle within the casing in position to retain said hinged member out of closing engagement with the top of the casing, substantially as described.

2. A receptacle of the character described, comprising a casing, a movable member adapted to close the top of the casing, means arranged within the casing and adapted to hold a milk bottle within the casing in a manner to retain said movable member out of closing position, and means on said movable member for locking the same on the removal of the bottle from its holding means, substantially as described.

3. In a receptacle of the character described, the combination with a door and jamb, of a holding device attached to the jamb, a casing adapted to be held by said holding device having an open side adapted to be closed by the door, said casing having an open top, a hinged member adapted to close the top of the receptacle, means arranged within the casing in position to retain said hinged member out of closing engagement with the top of the casing and means on said hinged member for locking the same when the bottle is removed, substantially as described.

4. A receptacle of the character described, comprising a casing having an open side adapted to be attached to a support convenient to a door to have its open side closed by the door, said casing having an open top, a hinged member adapted to close the top of the receptacle to hold the bottle within the receptacle against removal except when the door is opened, and means arranged within the casing and adapted to maintain an empty bottle within the casing in position to retain said hinged member out of closing engagement with the top of the casing until the bottle is removed, substantially as described.

5. A receptacle of the character described, comprising a casing having an open side adapted to be attached to a support convenient to a door to have its open side closed by the door, said casing having an open top, a hinged member adapted to close the top of the receptacle to hold the bottle within the receptacle against removal except when the door is opened, and a pivotally held device within the casing adapted to maintain an empty bottle within the casing in position to retain said hinged member out of closing engagement with the top of the casing until the bottle is removed, substantially as described.

6. The combination with a support, of a casing having an open rear portion with closed sides and front walls detachably held to said support, a door hinged to the casing and adapted to close the top thereof, and means arranged within the casing and adapted to support an object within the casing in position to retain said door out of closing engagement with the top of the casing, substantially as described.

7. A substantially rectangular casing having an open rear portion with closed sides and front walls, a pivotally held device arranged within the casing and adapted to support a bottle in an inverted position, a top having an opening therethrough forming a ledge around the same and located beneath the upper edge of said casing, a door hinged to the casing and adapted to close the top of the casing, and means for detachably holding the casing to a support convenient to a door for the purpose set forth.

This specification signed and witnessed this 10″ day of May A. D. 1909.

ALBERT G. BRODHEAD.

Witnesses:
M. F. KEATING,
M. DINNHAUPT.